United States Patent
Fulgham

(10) Patent No.: US 6,973,885 B2
(45) Date of Patent: Dec. 13, 2005

(54) MOBILE SUBTERRANEAN AERATOR AND DEEP ROOT STIMULATOR

(76) Inventor: Robert Edward Fulgham, 600 Smokey Mountain Dr., Tupelo, MS (US) 38801

( * ) Notice: Subject to any disclaimer, the term of this patent is extended or adjusted under 35 U.S.C. 154(b) by 18 days.

(21) Appl. No.: 10/819,484

(22) Filed: Apr. 8, 2004

(65) Prior Publication Data

US 2005/0223955 A1 Oct. 13, 2005

(51) Int. Cl.⁷ .............................................. A01C 23/00
(52) U.S. Cl. ...................................... 111/129; 175/71
(58) Field of Search .......................... 111/7.1, 7.2, 7.3, 111/7.4, 118, 127, 129; 175/424, 65, 67, 175/71

(56) References Cited

U.S. PATENT DOCUMENTS

| | | | |
|---|---|---|---|
| 3,886,874 A | 6/1975 | Platz | |
| 4,570,553 A * | 2/1986 | Ito | 111/118 |
| 4,807,545 A | 2/1989 | Joy | |
| 4,850,291 A | 7/1989 | Masuko | |
| 4,903,618 A * | 2/1990 | Blair | 111/118 |
| 4,917,304 A * | 4/1990 | Mazzei et al. | 239/64 |
| 4,934,287 A | 6/1990 | Guin et al. | |
| 5,005,601 A * | 4/1991 | Strong | 137/205.5 |
| 5,115,750 A | 5/1992 | White | |
| 5,170,729 A | 12/1992 | Benner | |
| 5,503,090 A | 4/1996 | Guzan | |
| 5,503,091 A * | 4/1996 | Foster et al. | 111/127 |
| 5,609,417 A * | 3/1997 | Otte | 366/137 |
| 5,673,637 A | 10/1997 | Colburn, Jr. | |
| 5,727,484 A * | 3/1998 | Childs | 111/7.4 |
| 5,802,996 A * | 9/1998 | Baxter | 111/118 |
| 6,182,586 B1 | 2/2001 | Hunt | |

* cited by examiner

*Primary Examiner*—Robert E Pezzuto
*Assistant Examiner*—Nathan Mammen
(74) *Attorney, Agent, or Firm*—Stephen D. Carver

(57) ABSTRACT

A mobile treatment system for subterraneously aerating and stimulating root zones with a probe. Suitable controls enable the operator to mix liquid root stimulator solution within a storage tank, and then pump it into the ground through the probe. A motor-driven air compressor controls a pneumatic holding tank to store pressurized air. The multi-segmented probe has a rigid, upper segment that receives liquid through a check valve, an intermediate segment receiving high pressure air, and a lowermost section extending downwardly from a foot plate and terminating in a hardened point. Output orifices defined in the tip deliver air or solution subterraneously. A controller circuit times an injection cycle upon actuation of a probe-mounted switch by actuating a solenoid valve for metered fluid injection. When the injection cycle completes, a manual valve on the probe can be opened for aeration.

13 Claims, 10 Drawing Sheets

MOBILE SUBTERRANEAN AERATOR AND DEEP ROOT STIMULATOR

BACKGROUND OF THE INVENTION

1. Field of the Invention

The present invention relates generally to portable aerators and fertilizer applicators for subterraneously treating various plants, including trees, shrubs and the like. More particularly, the present invention relates to mobile fertilizer applicators that premeasure carefully administered fluid doses for pressurized application through probes that are manually forced into the ground. Known devices of this general nature are classified in U.S. Pat. No. Class 111, Subclasses 7.1–7.4.

2. Description of the Related Art

It is well known in the art that the health or "wellness" of trees or shrubs can be maintained or enhanced by periodically injecting fertilizers or nutrients proximate the roots. A variety of systems exist in the art for subterraneously injecting various treating substances in the ground around the target roots. Additionally, it is known to loosen the soil by forcibly injecting compressed air into the ground adjacent the roots. Some prior art systems include a portable tank whose contents are forced into the ground with a manually-operated probe. Some larger systems include a mobile arrangement with a heavy trailer supporting a plurality of components such as pumps, tanks, controllers, compressors, valves and other components.

For example, U.S. Pat. No. 4,807,545 issued to Joy on Feb. 28, 1989 proposes a hand-held apparatus for aerating and treating plants. An air hose is driven by a high pressure compressor and air tank unit, which draws water from a faucet. Granular fertilizer stored in a bin is suctioned into the fluid flow, and delivered subterraneously by a rigid tube that is inserted into a pre-drilled hole in the ground. Compressed air is used to loosen and treat the soil. Pressurized air forces the fertilizer into the ground, and pressurized water follows to dissolve and dilute the fertilizer, thereby moisturizing the soil and roots, and fertilizing the root system.

U.S. Pat. No. 4,850,291 issued to Masuko on Jul. 25, 1989 discloses a mobile fertilizer applicator for treating soil with a pneumatic nozzle that injects fertilizer from its tip. The nozzle is forced into the ground, and thereafter blasts of air are delivered to the soil. Fertilizer stored within a holding chamber is pneumatically drawn out and forced into the soil.

U.S. Pat. No. 4,934,287 issued Guin Jun. 19, 1990 discloses a mobile, subterraneous treatment apparatus for injecting fertilizer or nutrients into the soil adjacent plant root systems. A container for storing fertilizer communicates with a multi-valve holding chamber a various valves that control the delivery of fertilizer to an elongated applicator tube that is adapted to be inserted into the ground. The multi-valve holding chamber assembly prevents a stream of water from entering the closed container and permits a precise amount of fertilizer to be released into the elongated tube for subterraneous injection to the root zone. Eventually, moisture from the stream of water causes the dry fertilizer to block the pipe.

U.S. Pat. No. 5,115,750 issued to White on May 26, 1992 discloses a subsoil treatment system that subterraneously delivers compressed air via ground-piercing spike means. This mobile system is truck-mounted.

U.S. Pat. No. 5,170,729 issued to Benner on Dec. 15, 1992 discloses an injector device for subterraneously dispensing fertilizer through a hollow, ground-penetrating probe.

U.S. Pat. No. 5,503,090 issued to Guzan on Apr. 2, 1996 shows a portable, gravity-operated system. A portable tank strapped to an operator feeds fertilizer to adjacent roots by gravity feed.

U.S. Pat. No. 6,182,586 issued to Hunt Feb. 6, 2001 shows a soil injection apparatus with a hydraulically operated probe. A pumping system is activated after the probe has been forced into the soil a predetermined depth to inject chemicals or nutrients. A control system activates the probe hydraulic system and liquid pumping system.

Known systems such as those described above have many attributes. However, they are often difficult to use. Quite commonly, fertilizer ejected from these systems is haphazardly ejected without being properly metered, and overdosing can result. Moreover, where repeated injections are necessary, the machine controls are cumbersome and inconvenient. Often the operator has to repeatedly move between a control box and the probe to complete a cycle, as all necessary controls are not conveniently accessible on the probe. Accordingly I have developed a combined system for remedying prior art problems and deficiencies.

BRIEF SUMMARY OF THE INVENTION

This invention provides a mobile, computerized root stimulating application and aerator system for plants, shrubs, trees, and the like. The system is mounted upon a durable trailer to be towed to the work location. Once it reaches an application location, it is easily controlled by a single operator. A pump, a reservoir for mixing and storing treatment materials, a controller, and an associated applicator nozzle are provided. Simple controls on the trailer can be set for either aeration, liquid injection, or solution preparation and mixing. A unique applicator probe is forced into soil adjacent a root system to be treated. Either air or the prepared root stimulating solution can thereafter be forced through the probe into the root region.

The system includes a storage battery for power, a fertilizer tank, and various lines and valves for delivering root stimulator solution to the probe. Aeration is achieved with a motor-driven air compressor supported by the trailer that fills a pneumatic holding tank. An air hose connects one portion of the probe to the high pressure air source.

The preferred probe is multi-segmented. A rigid, upper segment receives liquid through a check valve. The upper segment extends downwardly to a T-coupling that is connected at its bottom to an intermediate probe segment, to which high pressure air is forced via the T-connection. The intermediate section joins a lowermost probe section at a foot plate, adapted to be mechanically contacted by the operator to drive the probe into the ground. The lowermost probe section comprises coaxially fitted segments. It terminates at its bottom in a hardened steel, pointed tip that aids in penetration. Suitable output orifices defined in the tip deliver air or solution subterraneously.

A unique controller circuit delivers a timed cycle upon actuation of a push-button switch on the probe. At this time, a solenoid valve that controls fluid flow to the probe is opened for metering a predetermined fluid injection cycle. Nominally, this cycle is chosen to be between one-half to five seconds approximately.

Where desired, vigorous aeration cycles may be implemented. After a fluid injection cycle times out, for example, and aerator valve on the probe may be manually opened to inject high pressure air through the probe tip. A check valve in the fluid flow connection on the probe prevents unwanted air backflow. As soon as an aeration injection is done in a suitable target root zone, a timed injection of solution may follow after the air valve is closed and the push button switch is pushed by the operator. Thus after the probe has been forced into a given area, the operator can easily switch between successive aeration and fluid injection cycles, easing the labor and time requirements associated with the job.

Thus, an important object of my invention is to provide a mobile aerator and chemical injection system for treating trees, shrubs, plants and the like.

Another basic object is to provide a portable or mobile device that can be quickly transported to a work location and thereafter employed with a probe for penetrating the soil and thereafter fertilizing or aerating it.

It is another basic object of my invention to provide a mobile applicator for subterraneously injecting timed and controlled doses of root stimulator adjacent the root systems of plants.

In other words, it is an important object to provide a metered dose of root stimulator to pre-selected plant root zones.

A related general object is to provide a mobile, trailer mounted system of the character described that carefully applies predetermined quantities of nutrients, fertilizer or liquids.

A related object is to automatically control a subterranean applicator such that doses are measured and applied automatically without overdoses, and without wasting time.

Another important object is to provide a mobile aerator and root stimulator system of the character described with a computerized controller wherein dispensing accuracy is enhanced.

Yet another basic object is to provide a highly mobile, trailer-mounted system for subterraneously aerating and treating soil.

It is another object to provide a lightweight, subterraneous injection system for treating plants and trees with automatically premeasured doses of substances.

These and other objects and advantages of the present invention, along with features of novelty appurtenant thereto, will appear or become apparent in the course of the following descriptive sections.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
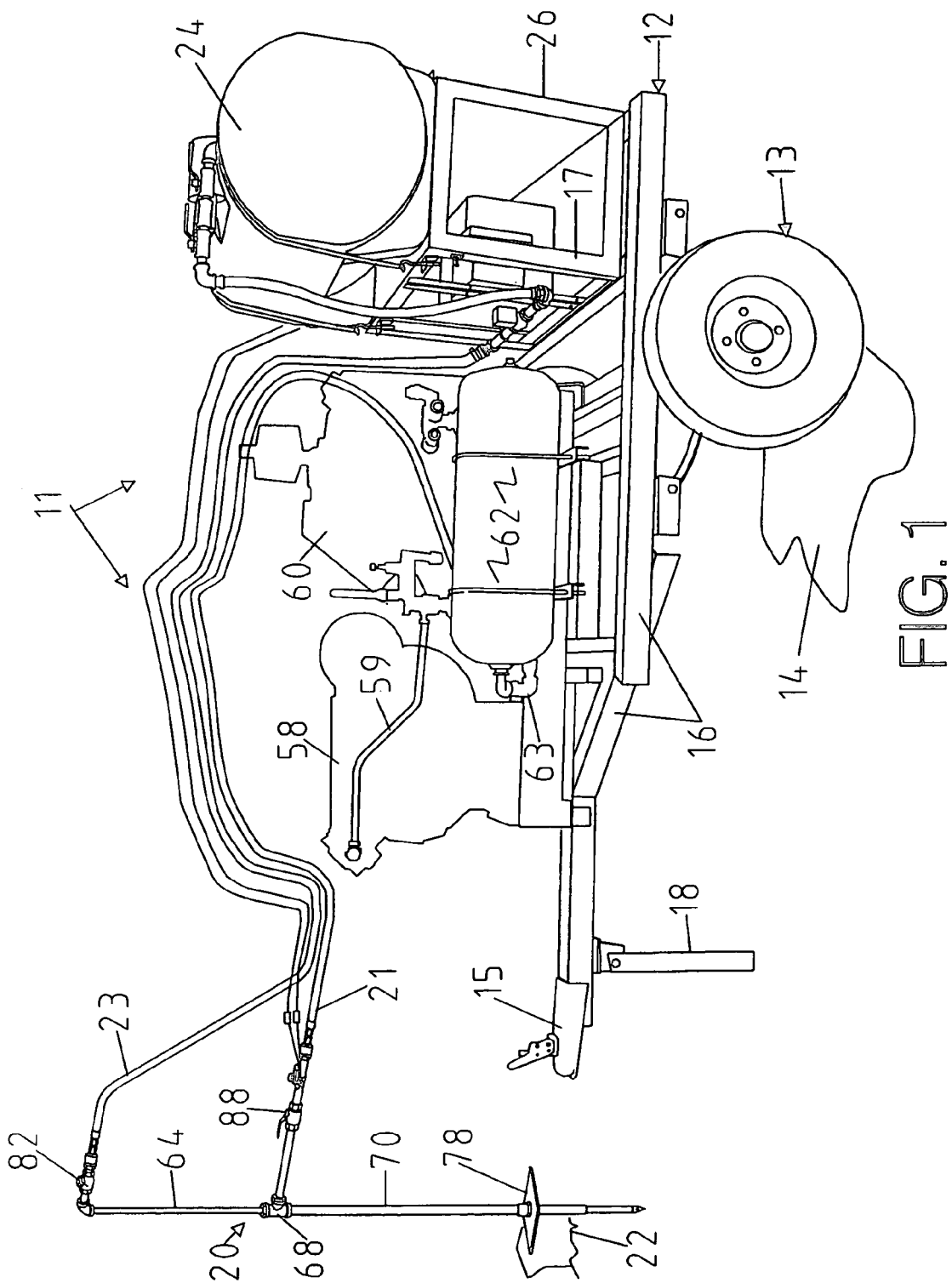
FIG. 1 is a fragmentary perspective view of my mobile soil treating system, with the probe shown out of the ground.
Figure 2:
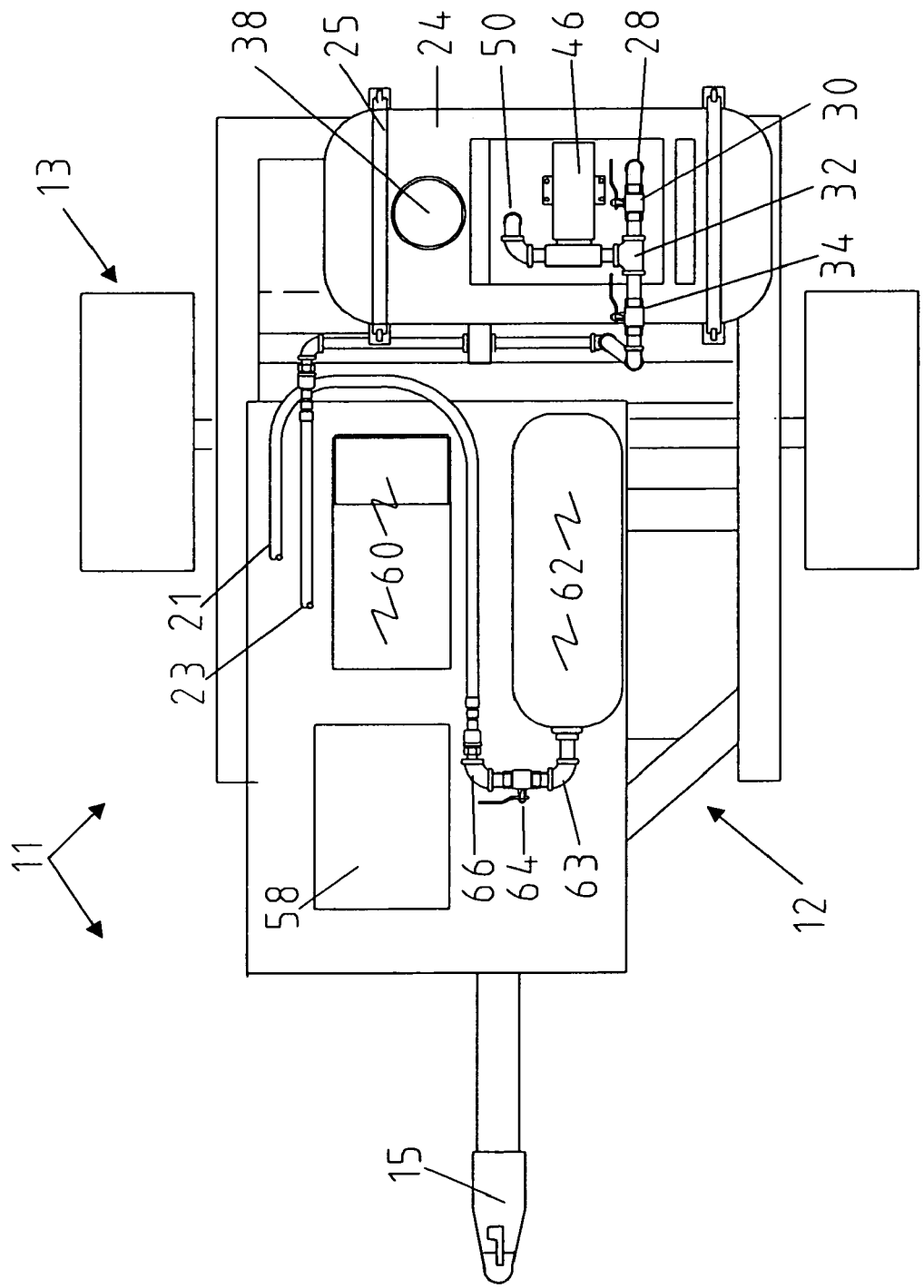
FIG. 2 is a top plan view thereof.

Turning initially to FIGS. 1 and 2 of the appended drawings, a mobile root treating system constructed in accordance with the best mode of the invention has been generally designated by the reference numeral 11. The applicator system 11 preferably comprises a towable, 1500 pound rated trailer 12 including a rigid frame 16 supported by a wheeled, rear axle 13. The trailer frame has a conventional tongue 15 for connection to a suitable tow vehicle. When the system 11 reaches an area to be treated proximate ground 14, it can be uncoupled and supported in an upright position by a deployable foot 18. Once deployed, a unique applicator probe 20 is forced into the soil 22 proximate the root system of a plant or tree to be serviced. Air can be forced into the probe via pneumatic hose 21, and liquid reaches it via hose 23. Once probe 20 penetrates soil 22, various agrichemicals or fertilizer may be subterraneously injected by the probe as described hereinafter. In addition, the soil may be vigorously aerated and broken up to promote plant health.

With joint reference directed to FIGS. 1–5, a rigid, generally cylindrical, elevated liquid fertilizer tank 24 is secured by straps 25 upon a rigid, box-like mounting platform 26 that is constructed from numerous angle steel segments. The welded steel platform 26 is generally in the form of a parallelepiped, and it is preferably mounted atop the trailer at the rear end. A master on-off switch 31 is conveniently mounted on platform 16 upon leg 17 (i.e., FIG. 3).

Figure 3:
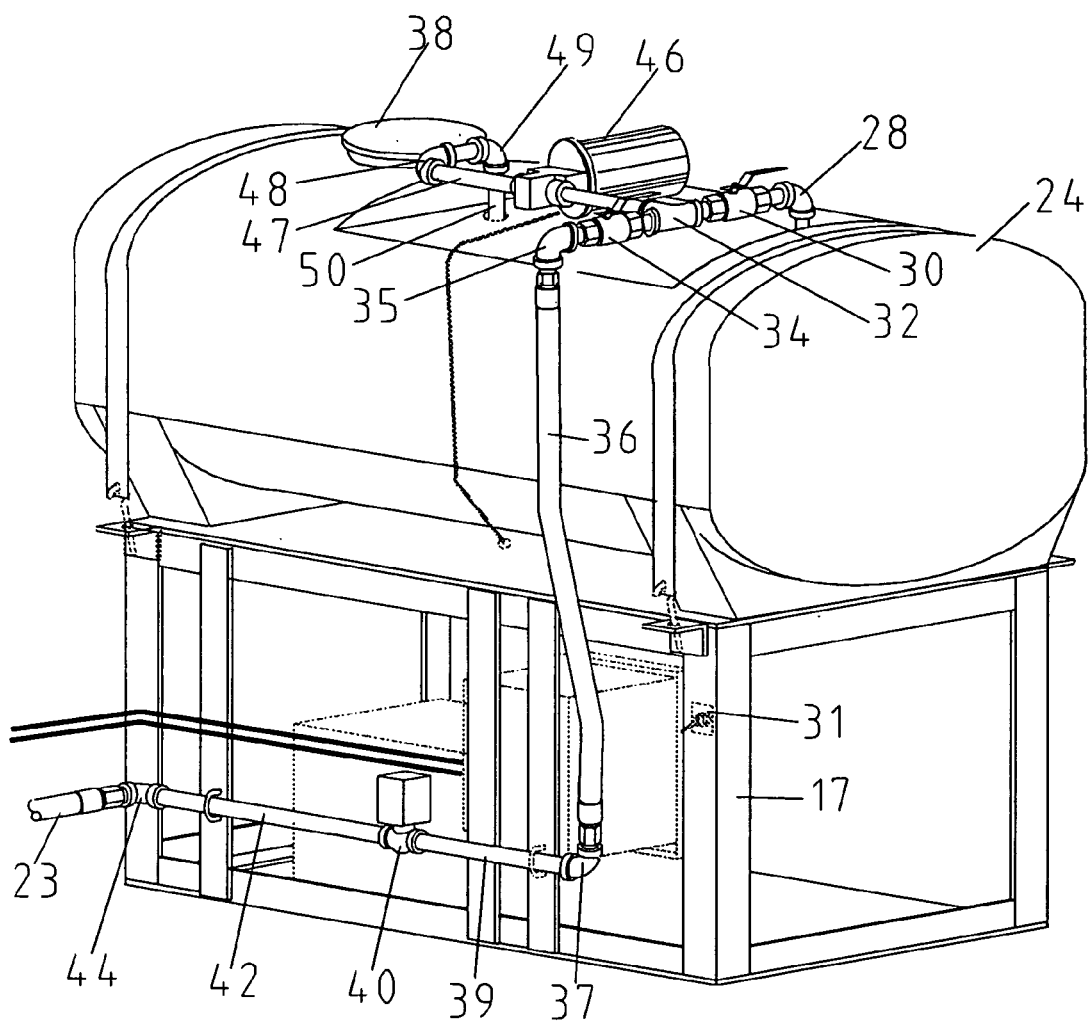
FIG. 3 is an enlarged fragmentary, frontal isometric view of the preferred holding tank assembly.
Figure 10:
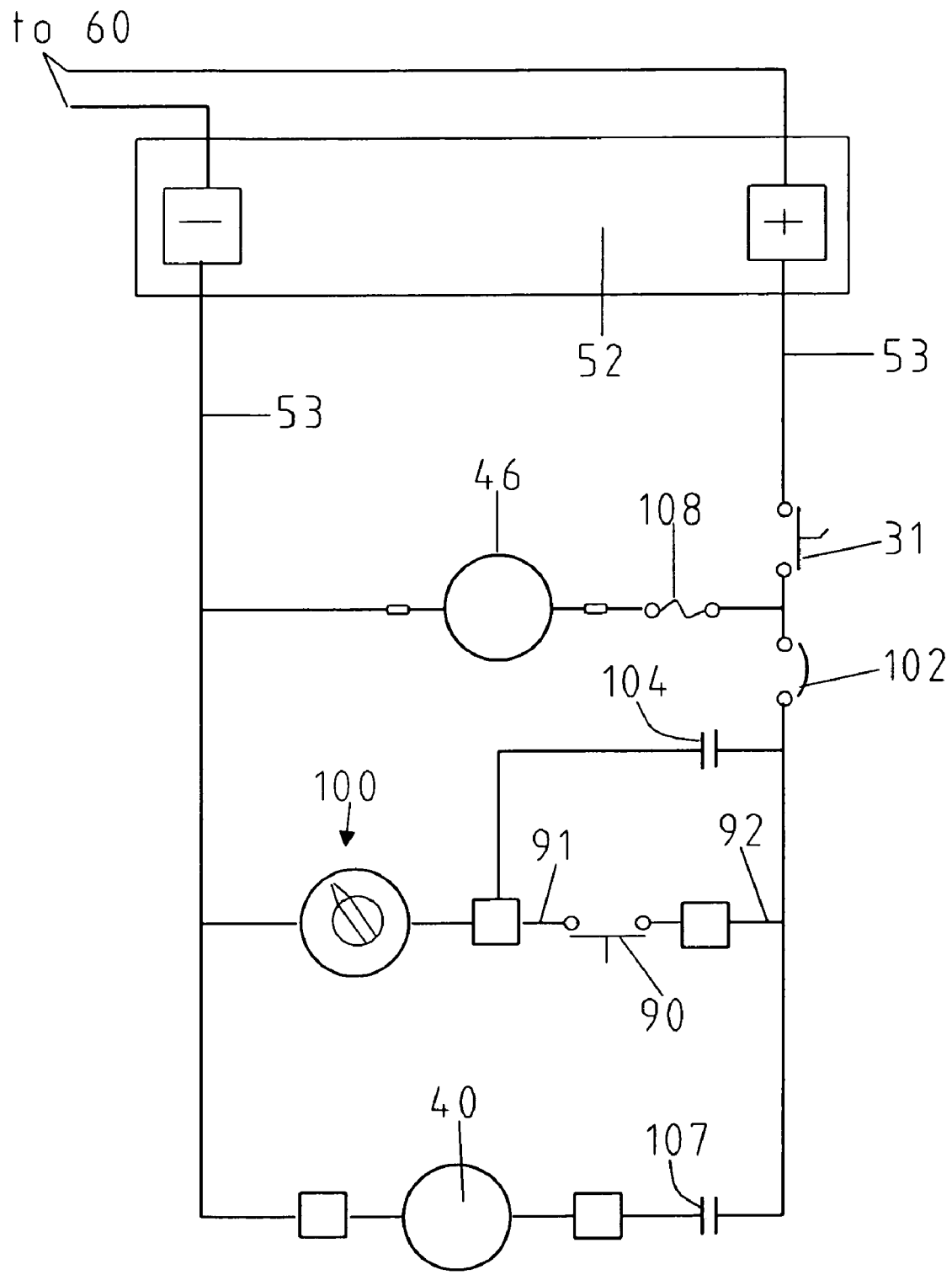
FIG. 10 is an electrical schematic view of the preferred controller circuit.

Chemicals stored within tank 24, which is filled by removing fill cap 38, can be forcibly mixed by twelve volt, pressure-activated direct current diaphragm pump 46. The chemicals mixture is pulled from tank 24 via pipe 50 (i.e., FIGS. 3–5) through elbows 49, 48 via pipe 47 to pump 46. Pump 46 maintains approximately forty-five PSI and turns on automatically whenever pressure drops below forty-five pounds. The pump 46 outputs via T-connector 32. With valve 34 closed and valve 30 open, material is recycled via pipe 27 back into tank 24, which mixes the preparation. With valve 30 closed and valve 34 open, material can be routed through elbow 35, hose segment 36, elbow 37, and pipe 39 to a DC-operated solenoid valve 40 (FIGS. 3, 10). Pipe 42 connects valve 40 to elbow 44, that is connected to liquid supply hose 23 that leads to applicator probe 20 (FIG. 1).

Figure 4:
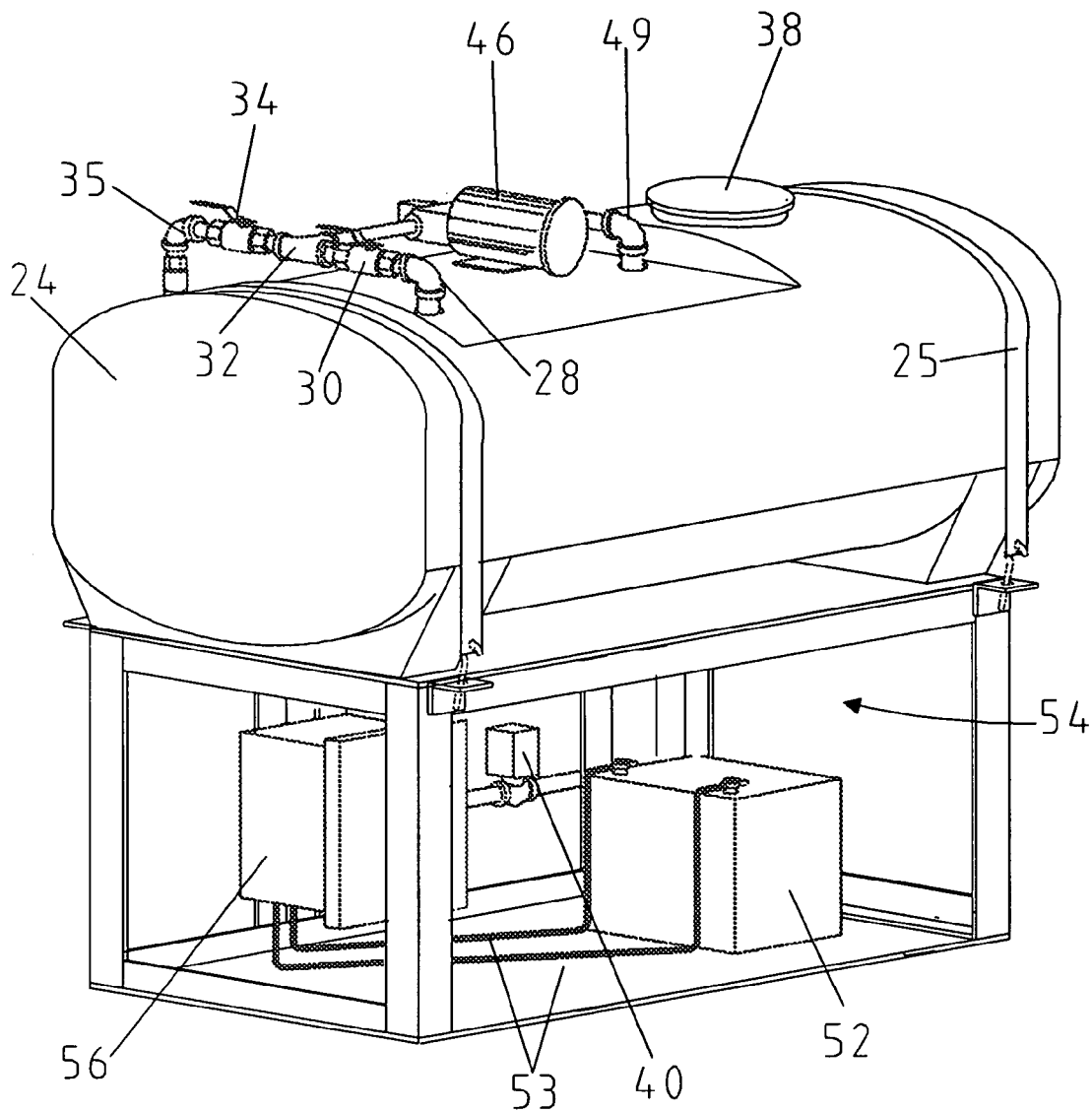
FIG. 4 is an enlarged fragmentary, rear isometric view of the holding tank assembly.
Figure 5:
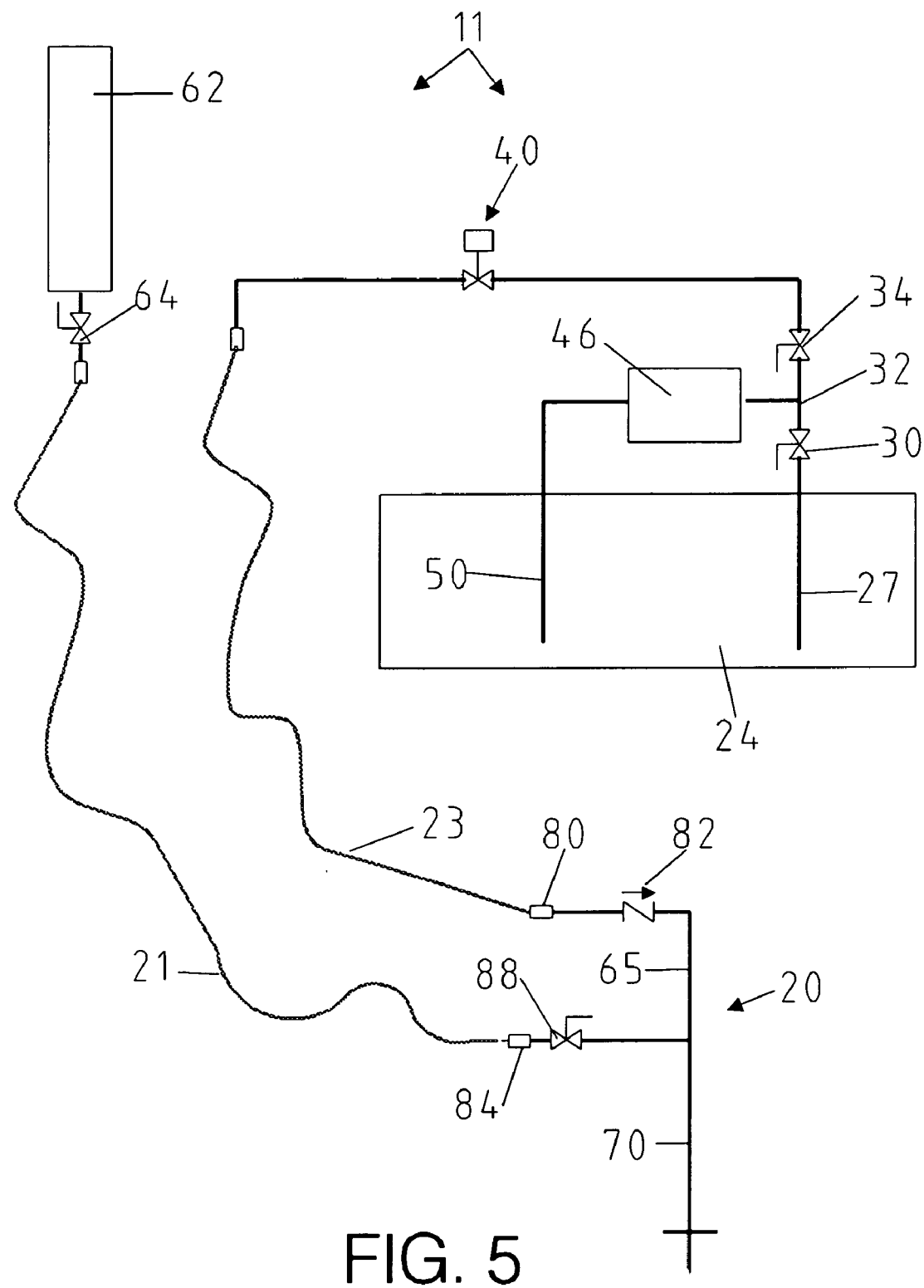
FIG. 5 is a fluid flow diagram.

With primary emphasis directed to FIG. 4, a twelve-volt storage battery 52 is secured beneath the tank 24 within the hollow region 54. Lines 53 comprising DC 12 volt current cables connect the battery to a controller 56 housed within region 54. The battery powers the circuitry, the pump 46, and the controller 56 as described hereinafter. Battery 52 is recharged by alternator on engine 60.

With reference now directed primarily to FIG. 2, the pneumatic details are described. An air compressor 58, which is supported upon the trailer top, has a capacity of nineteen CFM at 200 PSI. A conventional gasoline engine 60 atop the trailer 12 operates air compressor 58. Air is accumulated within a holding tank 62 via copper line 59 (FIG. 1). As best seen in FIG. 2, air is outputted from holding tank 62 via elbow 63, ball valve 64, elbow 66, and air hose 21 that leads to probe 20 as previously described.

Figure 6:
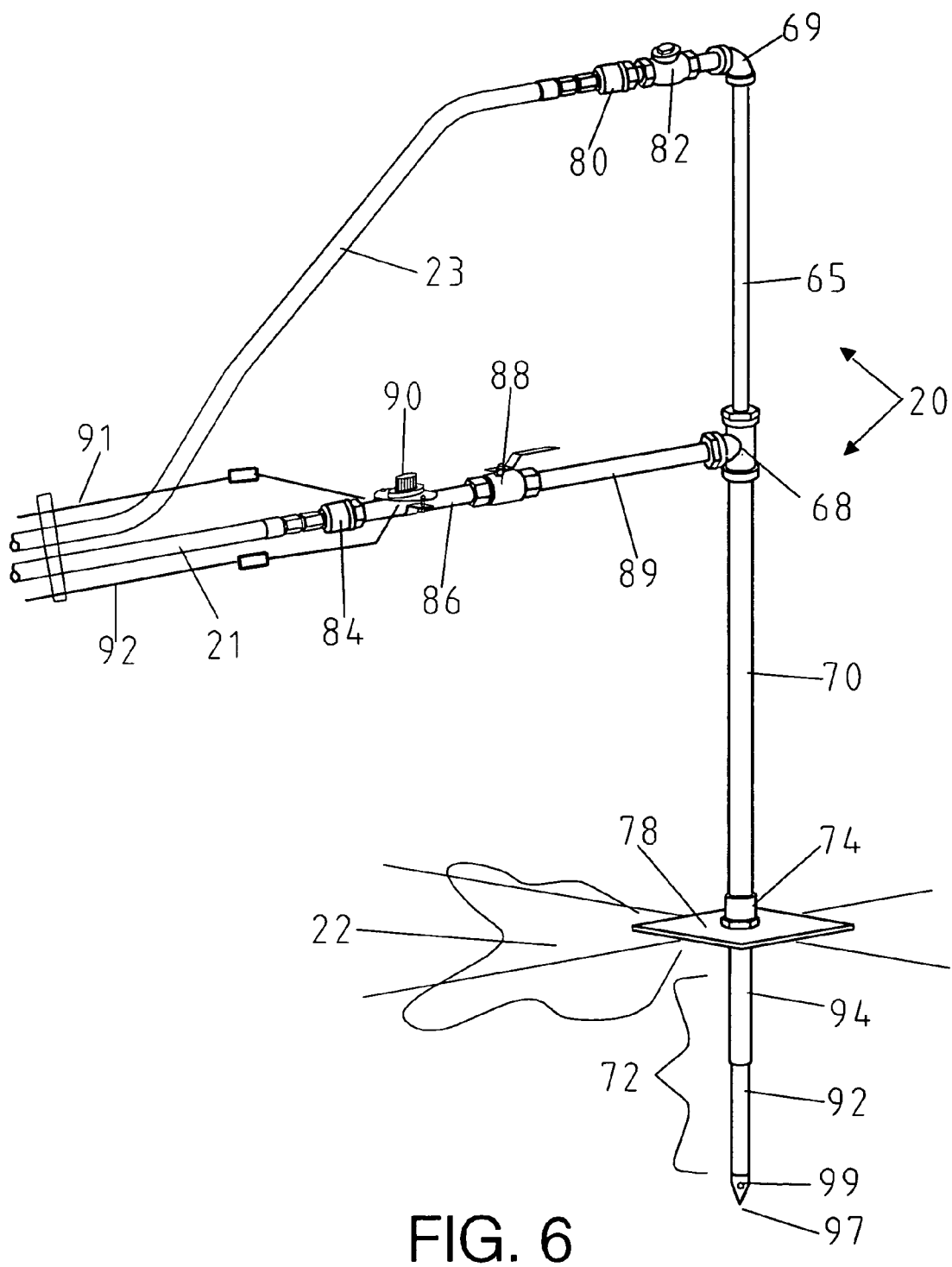
FIG. 6 is an enlarged, fragmentary, isometric view of the preferred probe and the connection hardware.

Details of the preferred probe 20 are best understood by jointly referencing FIGS. 5–8. The multi-segmented probe 20 comprises a rigid, upper pipe segment 65 extending between a steel T-coupling 68 and an upper elbow 69. An intermediate probe pipe segment 70 extends downwardly from T-coupling 68 to a coupling 74 (FIGS. 6, 8) that connects to a bushing 76 that joins lower probe pipe segment 72. Pipe segments 70 and 72 are axially aligned, and they are rigidly mated at foot plate 78. Normally in operation, the foot plate 78 is pressed with the operators' feet towards the soil 22 adjacent roots to be treated. As best seen in FIG. 6, the lowermost probe pipe segment 72 is thus forced into the ground, with pipe segments 65 and 70 axially aligned with it above plate 78. Liquid reaches probe 20 from hose 23 via quick-coupler 80 (i.e. FIG. 7) that leads to a one-half inch check valve 82 leading to elbow 69 and upper probe pipe segment 65. Preferably, check valve 82 opens at ten-PSI pressure and resists 200-PSI backpressure.

Figure 7:
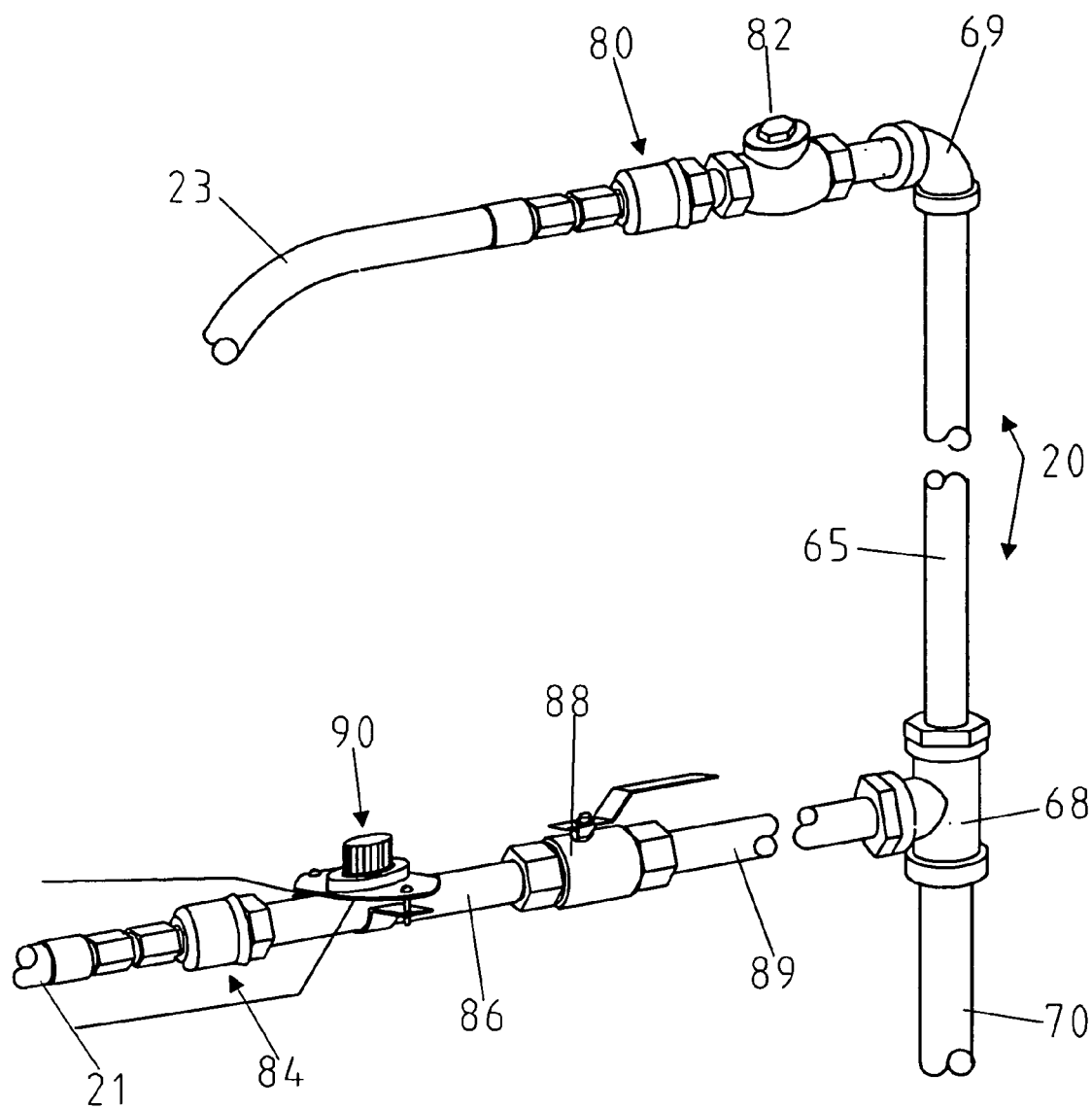
FIG. 7 is a further enlarged, fragmentary, isometric view similar to FIG. 6, showing preferred connection hardware.

High pressure air reaches the probe 20 via hose 21 previously described, that connects via a quick coupler 84 (FIG. 7). A small pipe segment 86 connects to a 200 PSI manually operated ball-type aerator valve 88 that is connected via pipe segment 89 to the previously described T-coupling 68. An electric, preferably push-button switch 90 is mechanically secured to pipe segment 86 (i.e., FIG. 6) on probe 20. Switch 90 allows the operator to conveniently activate a timed fluid injection cycle after the probe has been appropriately forced into the ground (i.e., soil 22).

Figure 8:
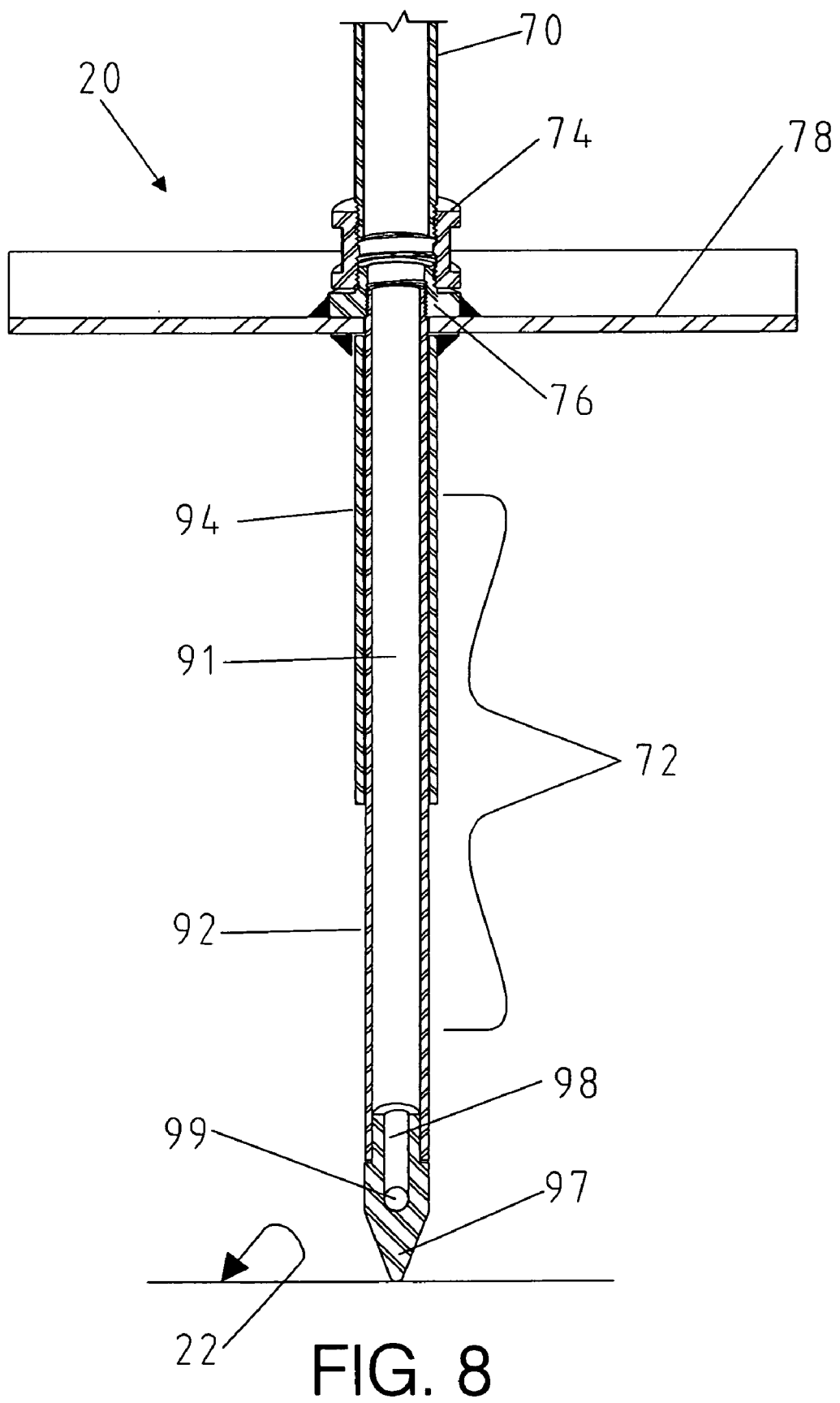
FIG. 8 is an enlarged, sectional view of the bottom portion of the preferred applicator probe, showing the probe prior to being forced into the ground.

Referring to FIG. 8, there is a hollow probe interior 91 (FIG. 8) communicating with all probe pipe segments. The lowermost probe pipe segment 72 comprises a primary pipe section 92 that is coaxially mated to outer pipe stiffener 94. The longer, lower-diameter pipe section 92 is threadably received within bushing 76 at its top proximate footplate 78. Bushing 76 is welded to plate 78. As lower probe pipe segment 72 is fitted to bushing 76, and pipe stiffener 94 is welded to the underside of plate 78, a firm and durable mechanical connection is established. The bottom of pipe segment 72 (FIG. 6) receives a hardened, press-fitted steel point 97 that penetrates soil 22 (FIG. 8). The hollow interior 98 of point 97 is in fluid flow communication with pipe interior 91 described previously, and with output orifices 99.

Figure 9:
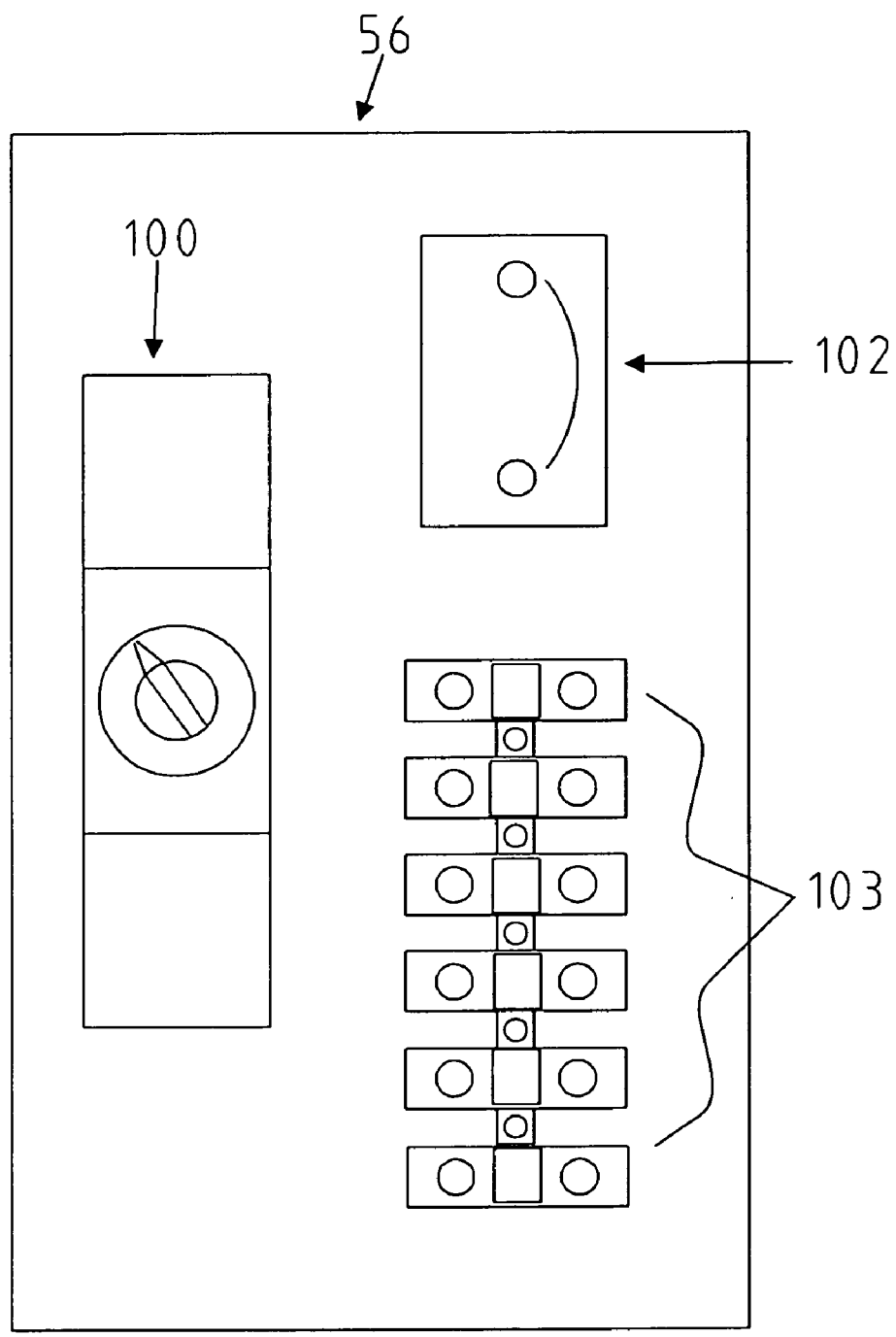
FIG. 9 is a diagrammatic view of the preferred controller.

With joint reference now directed to FIGS. 9 and 10, the preferred controller 56 is an AHC Fluid Power-brand controller. Controller 56 comprises an H3YN-2 Omron timer 100, a ten-amp circuit breaker 102 (FIGS. 9, 10), and a connector strip 103 (i.e., FIG. 9) for mechanically interconnecting the wiring seen schematically in FIG. 10. Voltage applied from battery 52 across lines 53 and through fuse 108 activates pump 46 (i.e. if master switch 31 is "on") if valve 30 is opened. The manual opening of valve 30 is sensed by the pressure sensitive pump 46, causing it to turn "on" to maintain a nominal output pressure of approximately forty-five pounds. Timer 100 is turned "on", if the push button switch 90 on the probe 20 is depressed or turned "on". When switch 90 is momentarily pushed, latching occurs across latching relay contacts 104 (FIG. 10) establishing a timing cycle by timer 100 to activate and thus open solenoid valve 40 (i.e., FIGS. 3, 4, and 10) by closing contacts 107 (FIG. 10). Thus activated, valve 40 delivers liquid to hose 23 leading to the probe 20. Nominally, this cycle is variable, with injection cycles of up to several seconds being possible. Preferably, a timing cycle of three seconds is chosen to inject approximately eight fluid ounces of treatment mixture into the ground, with pump pressures of forty-five PSI.

In operation, the mobile system 11 is towed to an area requiring service. Tank 24 is manually filled with the desired chemical mixture, comprising fertilizer and/or water by first removing tank fill cap 38 (FIG. 1) and pouring the desired substances into tank 24. These substances can be vigorously mixed if valve 34 is closed and valve 30 is open. With pump 46 activated via switch 31, material will be cycled through the tank lines 27, and 50 (i.e., FIG. 5).

With the tank contents appropriately mixed, valve 34 (FIG. 3) is opened and valve 30 is closed. Probe 20 may be manually forced into the desired soil 22, preferably with probe air valve 88 (FIG. 6) closed. Air is then injected into the ground by opening valve 88 to break up dirt and create a void, and then vale 88 is closed. High pressure air directed to the probe is forced though the probe interior 91 (FIG. 8) downwardly through point interior 98 and out of orifices 99 in point 97 (FIG. 8). With the ground broken up from the air, the electric push-button switch 90 on the probe is then pressed so timer 100 will turn on and open solenoid valve 40 (FIG. 10) for a predetermined time of approximately three seconds. This will allow a limited liquid volume (i.e., preferably eight fluid ounces) of the liquid mixture within tank 24 to be transferred from tank 24 via hose 23 through check-valve 82 (FIG. 6) into the top of the probe 20, and through the probe for ejection outwardly of orifices 99 (FIG. 8). When the latter cycle times out, aeration may again occur by opening valve 88 (FIG. 6) on the probe. High pressure air applied through valve 88 (FIG. 7) cannot enter liquid hose 23 because check valve 82 prevents backflow. The cycle may be repeated as necessary to treat a given root region. With the job completed, the motor and compressor shut down, the master switch 31 turned off, and the probe packed away, the trailer 12 may be towed to another job site.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A mobile aerator and deep root stimulator system for subterraneously:
   treating plants such as trees, bushes, shrubs and the like, said system comprising:
   a trailer adapted to be towed to a job location near said plants to be treated;
   a tank for preparing and storing root treatment solution, the tank having an interior and first and second, spaced apart pipes in fluid flow communication with said interior;
   a pump coupled to said first pipe for withdrawing fluid from said tank and providing a high pressure source of root treatment solution;
   a first valve for redirecting solution from said pump back into said tank via said second pipe for mixing the tank contents;
   a multi-segmented probe for subterraneously injecting said treatment solution or high pressure air into the ground adjacent or proximate the roots of plants to be treated;
   a second valve for directing treatment solution from said pump to said probe;
   a solenoid-operated valve for allowing or blocking the passage of treatment solution to said probe;

wherein the probe comprises:
- a rigid, upper segment for receiving treatment solution through a check valve;
- a rigid foot plate that can be manually manipulated;
- an intermediate segment connected via a T-coupling to the upper segment and extending downwardly to the foot plate;
- an aerator valve leading to the T-coupling for selectively admitting high pressure air into the probe for subterranean application; and,
- a lowermost probe segment terminating in a hardened tip adapted to penetrate ground that comprises at least one outlet orifice for ejecting air or root treatment solution; and,
- a computer controller establishing a timed injection cycle of treatment solution for activating said solenoid-operated valve for a predetermined time interval, thereby providing a preselected dose of treatment solution to said probe for subterraneous injection.

2. The system as defined in claim 1 further comprising:
an air compressor;
an air holding tank in fluid flow communication with the compressor;
an internal combustion engine for operating the air compressor;
the air compressor, the holding tank, and the engine secured to the trailer; and,
means for selectively interconnecting the probe with said air holding tank to deliver high pressure air.

3. The system as defined in claim 2 wherein the lowermost probe pipe segment comprises a lower pipe section and an upper coaxial pipe stiffener welded to the foot plate, the lower pipe section coaxially mated to the pipe stiffener and extending downwardly to the probe tip.

4. The system as defined in claim 1 wherein:
a treatment solution injection cycle can be initiated by an electrical switch mounted on said probe adapted to be conveniently accessed by an operator;
the controller comprises a timer that is activated for a predetermined time interval by said electrical switch on said probe; and
the timer opens said solenoid valve when activated to establish fluid flow for said treatment solution injection cycle.

5. The system as defined in claim 4 including means for latching the electrical switch mounted on said probe for said predetermined time interval immediately after it is manually activated.

6. A mobile aerator and deep root stimulator for subterraneously treating plants such as trees, bushes, shrubs and the like, said stimulator comprising:
a trailer adapted to be towed to job location near said plants to be treated;
a tank secured to the trailer for preparing and storing root treatment solution;
a pump in fluid flow communication with said tank for withdrawing fluid from said tank and automatically maintaining a preselected output pressure of root treatment solution;
a multi-segmented probe for subterraneously injecting said treatment solution or high pressure air into the ground adjacent or proximate the roots of plants to be treated;
a source of high pressure air;
an aerator valve for selectively delivering high pressure air to said probe from said source;
a solenoid valve for allowing or blocking the passage of treatment solution from said pump to said probe; an electrical switch mounted on said probe;
wherein the probe comprises:
- a rigid, upper segment for receiving treatment solution from said solenoid valve through a check valve;
- a rigid foot plate that can be manually manipulated to force the probe into the ground;
- an intermediate segment connected via a T-coupling to the upper segment and extending downwardly to the foot plate;
- means coupling said aerator valve to said T-coupling for selectively admitting high pressure air into the probe for subterraneous application; and,
- a lowermost probe segment terminating in a hardened tip adapted to penetrate ground that comprises at least one outlet orifice for ejecting air or root treatment solution; and,
- a computer controller for establishing a timed injection cycle of treatment solution by activating said solenoid-operated valve for a predetermined time interval in response to said electric switch, thereby providing a preselected dose of treatment solution to said probe for subterraneous injection.

7. The stimulator as defined in claim 6 wherein the lowermost probe pipe segment comprises a lower pipe section and an upper coaxial pipe stiffener welded to the foot plate, the lower pipe section coaxially mated to the pipe stiffener and extending downwardly to the probe tip.

8. The stimulator as defined in claim 6 wherein:
the controller comprises a timer that is activated for a predetermined time interval by said electrical switch on said probe; and
the timer opens said solenoid valve when activated to establish fluid flow for said treatment solution injection cycle.

9. The stimulator as defined in claim 6 including means for latching the electrical switch mounted on said probe for said predetermined time interval immediately after it is manually activated.

10. A mobile aerator and deep root stimulator for subterraneously treating plants such as trees, bushes, shrubs and the like, said stimulator comprising:
a trailer adapted to be towed to job location near said plants to be treated;
a liquid tank secured to the trailer for preparing and storing root treatment solution;
an air compressor for delivering high pressure air;
an air holding tank in fluid flow communication with the compressor for storing high pressure air;
an engine for operating the air compressor;
a pump in fluid flow communication with said liquid tank for withdrawing fluid from said liquid tank and automatically maintaining a preselected output pressure of root treatment solution;
a probe for subterraneously injecting said treatment solution or high pressure air into the ground adjacent or proximate the roots of plants to be treated, the probe comprising:
- a rigid, upper segment for receiving treatment solution;
- a rigid foot plate that can be manually manipulated to force the probe into the ground;
- an intermediate segment connected via a T-coupling to the upper segment and extending downwardly to the foot plate;

a lowermost probe segment terminating in a hardened tip adapted to penetrate ground that comprises at least one outlet orifice for ejecting air or root treatment solution; and, an electrical switch mounted on said probe;

an aerator valve for selectively delivering high pressure air to said probe T-coupling from said air holding tank;

a solenoid valve for allowing or blocking the passage of treatment solution from said pump to upper probe segment; and, a computer controller for establishing a timed injection cycle of treatment solution by activating said solenoid-operated valve for a predetermined time interval in response to said electric switch, thereby providing a preselected dose of treatment solution to said probe for subterraneous injection, the controller comprising a timer that is activated for a predetermined time interval by said electrical switch on said probe and the timer opens said solenoid valve when activated to establish fluid flow for said treatment solution injection cycle.

11. The stimulator as defined in claim 10 wherein the lowermost probe pipe segment comprises a lower pipe section and an upper coaxial pipe stiffener welded to the foot plate, the lower pipe section coaxially mated to the pipe stiffener and extending downwardly to the probe tip.

12. The stimulator as defined in claim 10 including means for latching the electrical switch mounted on said probe for said predetermined time interval immediately after it is manually activated.

13. The stimulator as defined in claim 12 wherein the lowermost probe pipe segment comprises a lower pipe section and an upper coaxial pipe stiffener welded to the foot plate, the primary segment coaxially mated to the pipe stiffener and extending downwardly to the probe tip.

* * * * *